Sept. 22, 1936.  A. H. FISKE ET AL  2,055,284
METHOD OF PRODUCING SODIUM ALUMINUM SULPHATE
Filed March 20, 1935
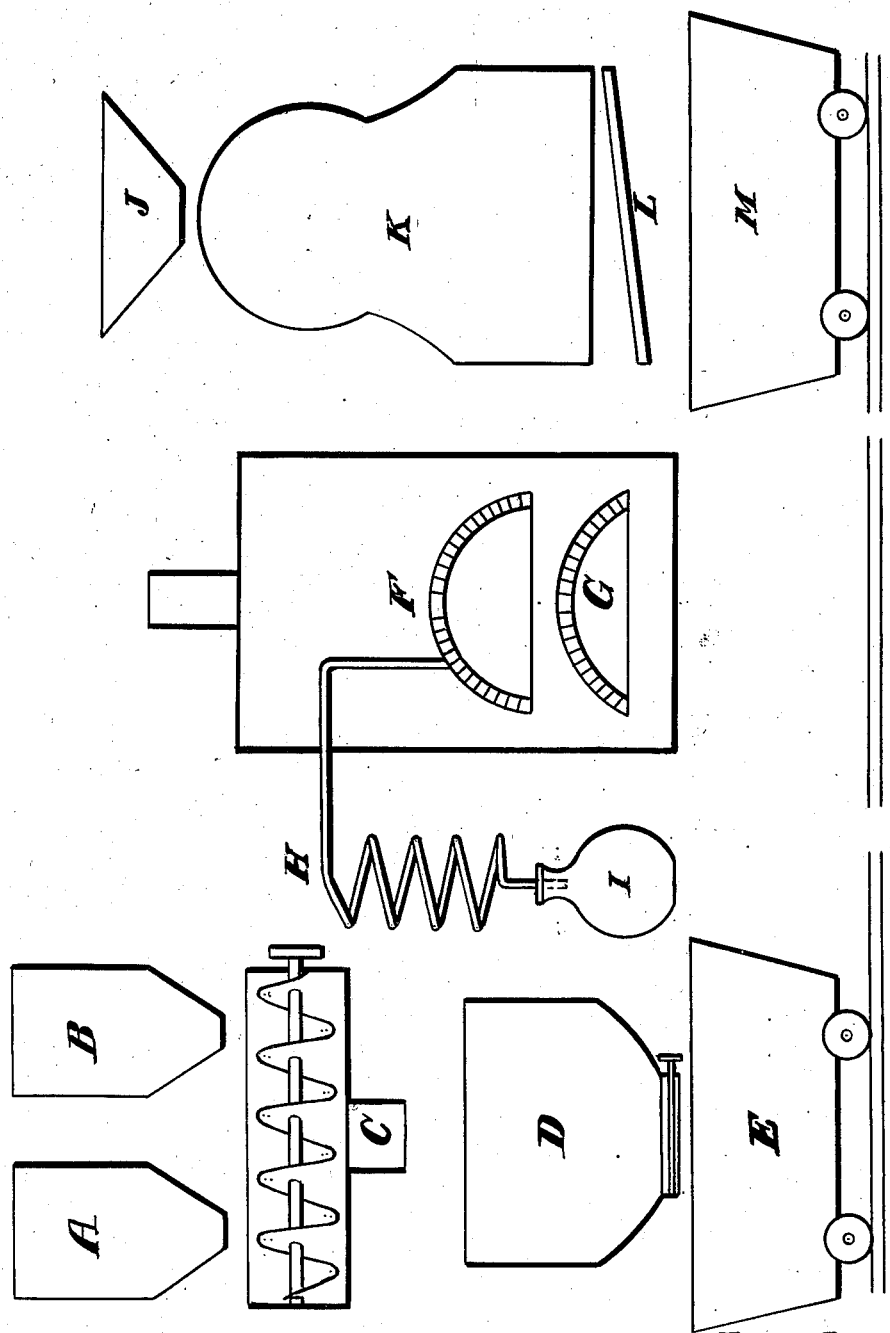
Inventors
Augustus H. Fiske
Charles S. Bryan
By Attorney Patented Sept. 22, 1936

2,055,284

UNITED STATES PATENT OFFICE 2,055,284

METHOD OF PRODUCING SODIUM ALUMINUM SULPHATE

Augustus H. Fiske, Warren, and Charles S. Bryan, Providence, R. I., assignors to Rumford Chemical Works, Rumford, R. I., a corporation of Rhode Island Application March 20, 1935, Serial No. 11,979

5 Claims. (Cl. 23—118)

In the manufacture of sodium aluminum sulphate to which this invention pertains, such sulphates have been generally heretofore produced as by reacting a hydrated oxide of aluminum source in sulphuric acid (usually with other steps or treatments) and the combination in said form with sodium sulphate. The excess acid factor of the reaction and other impurities, if any, were then removed by heating and/or by crystallizing.

Such methods were usually slow and costly and the product obtainable commercially, although satisfactory in quality, required large capital to purchase equipment for the various steps in the process. Such methods also required highly trained technical staffs and generally involve the employment of more chemical knowledge than is necessary with our present invention.

The product which we prepare by our process is known as sodium aluminum sulphate and is prepared on a large scale as one of the major chemical industries by large chemical manufacturers.

Its use is confined almost entirely to the food industry and more particularly to its use as an ingredient in baking powder.

Since a food manufacturer or a baking powder manufacturer may not necessarily have available any considerable technical resources or extensive chemical knowledge, nor be equipped to manufacture sodium aluminum sulphate by the usual process, our invention enables him to prepare sodium aluminum sulphate of proper quality for food purposes by purchasing, as raw materials as sources of his sodium aluminum sulphate, substances which can be converted directly into sodium aluminum sulphate without having any great chemical knowledge or expensive apparatus.

Instead of starting with the crude ore from which the aluminum oxide is extracted by means of sulphuric acid, as is done on a large scale by many chemical manufacturers, we can accordingly to our concept start in our process with aluminum sulphate which is manufactured for various purposes and available in the open market.

We have discovered that by mixing of aluminum sulphate and acid sodium sulphate and subsequent heating to a carefully regulated temperature a chemical combination takes place between the two ingredients such that the acidity of the resultant material is higher than the acidity of a mixture of sodium sulphate and aluminum sulphate in the equivalent amounts present in the finished product.

According to our invention a sodium aluminum sulphate of usual reactive strength and of great purity and whiteness may be produced by a method characterized by simplicity.

Our product and the methods of producing it are indicated generally in the proposition that there is a potential chemical reaction between acid sodium sulphate $NaHSO_4$, and aluminum sulphate $Al_2(SO_4)_3$, under heat.

As illustrative of our invention we submit the following disclosure and discussion which we have attempted to illustrate as to method by a schematic indication of apparatus and steps in the accompanying drawing.

Our concept was that of a new and simple process for producing sodium aluminum sulphate. We were immediately concerned with its relation to baking powder so that without intent to limit our rights we discuss our invention as applied in that field. It is, of course, applicable to other fields.

According to our inventions we may take as our sources, commercial acid sodium sulphate ($NaHSO_4$) and aluminum sulphate ($Al_2(SO_4)_3$) preferably of a high grade and purity. These we provide usually in a dry state and preferably comminuted so as to be intimately mixed. This pre-mixture, preferably in finely powdered form we then heat to just below a red heat, which for such material is about 968° F. In this heating of the mixture the following reaction presumably takes place:

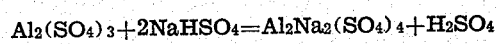

$$Al_2(SO_4)_3 + 2NaHSO_4 = Al_2Na_2(SO_4)_4 + H_2SO_4$$

During this heating the sulphuric acid is driven off as a vapor and recovered by condensation as indicated at H and I in the diagram. In this diagram the hopper A may be provided for the aluminum sulphate and the hopper B for the acid sodium sulphate. These being preferably in the finely powdered form as above indicated, may be intimately mixed as in a screw or like mixer C. If not previously pulverulent they may be ground together at this point (not indicated).

Thus processed they are discharged conveniently as into a bin D from which they can be conveniently trucked as by a floor car E to the furnace or muffle F heated as by a fire box G. After firing for a relatively short time or until the mix is brought to just below dull red and held only long enough to complete the reaction, the product is discharged from the muffle and is ready for grinding and other steps usual in the preparation of such materials as for use in a baking powder.

For example, we may take 33.5 parts by weight of aluminum sulphate $Al_2(SO_4)_3$ and dry mix in powdered form with 25.3 parts by weight of acid sodium sulphate $NaHSO_4$. This, it will be observed, is in the proportion of one molecule of $Al_2(SO_4)_3$ to two molecules of the acid sodium sulphate, $NaHSO_4$.

As we have already stated, the reaction takes place at a low red heat, approximately 968° F. We regard the upper limit that should be avoided as about 1400° F. at which point aluminum sulphate decomposes. Charges as of 500 lbs. can be readily controlled as to internal developments of temperature.

After a reasonable heat reaction the material is drawn from the retort and allowed to cool. It can then be ground and sifted to suitable fineness as for use in a baking powder.

It is to be noted that the normal acidic strength of the reaction of these ingredients after they have been reacted would be in any ordinary process calculated, for example, in units of equivalents of bicarbonate of soda reactive neutralization 92.22%. In contrast our method produces a product having an actual acidic bicarbonate of soda equivalent neutralizing strength of 103.32% after reaction.

This indicates a new and unexpected increase in the development of the acidic value by our process. This is obviously an important discovery. The resultant sodium aluminum sulphate so produced is actually available for combination in baking powder at an acidic or neutralizing value approximately 100% to 110% of its own weight in bicarbonate of soda units.

The method may be varied and the product correspondingly varied as to acidity or reactivity and as to its granular or crystalline form which differs from the two components before heating. All such materials and methods are therefore to be considered as comprehended in the following claims.

What we therefore claim and desire to secure by Letters Patent is:—

1. In a method of manufacturing sodium aluminum sulphate, those steps consisting in premixing acid sodium sulphate in finely divided form with a finely divided aluminum sulphate in chemically equivalent proportions to form sodium aluminum sulphate and in heating the mixture to just below a red heat whereby to produce a sulphate of high acidic value in the resultant sulphate.

2. In a method of manufacturing sodium aluminum sulphate, those steps consisting in premixing dry acid sodium sulphate in chemically equivalent proportions to form sodium aluminum sulphate with a dry aluminum sulphate and in heating the mixture to just below a red heat to produce a high acidic value in the resultant sulphate.

3. In a method of manufacturing sodium aluminum sulphate, those steps consisting in reacting dry premixed acid sodium sulphate and dry aluminum sulphate in chemically equivalent proportions to form sodium aluminum sulphate by heating to just below a red heat.

4. In a method of manufacturing sodium aluminum sulphate, those steps consisting in reacting dry premixed acid sodium sulphate and dry aluminum sulphate in chemically equivalent proportions to form sodium aluminum sulphate by heating to just below a red heat, and in conducting away the sulphuric acid formed by the reaction.

5. In a method of manufacturing sodium aluminum sulphate that step consisting in reactively sintering a premix of dry acid sodium sulphate and aluminum sulphate in chemically equivalent proportions to form sodium aluminum sulphate to produce an intensified acidic value in the resultant product.

AUGUSTUS H. FISKE.
CHARLES S. BRYAN.